Aug. 28, 1934.      H. B. FORESMAN      1,971,603
WEATHER STRIP
Filed March 2, 1932
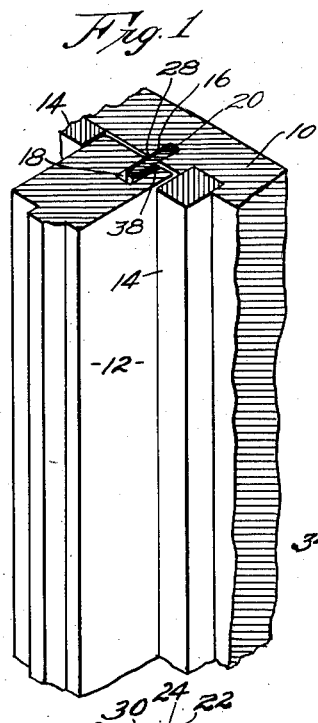
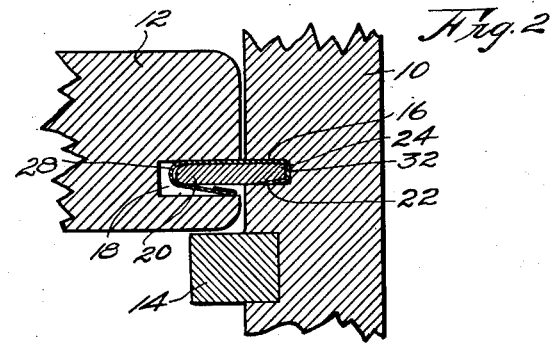
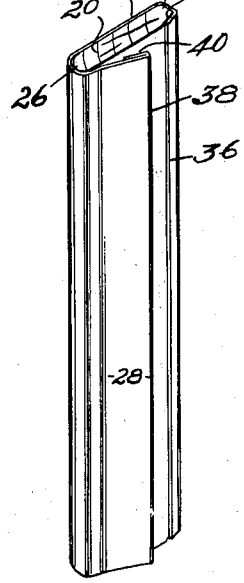
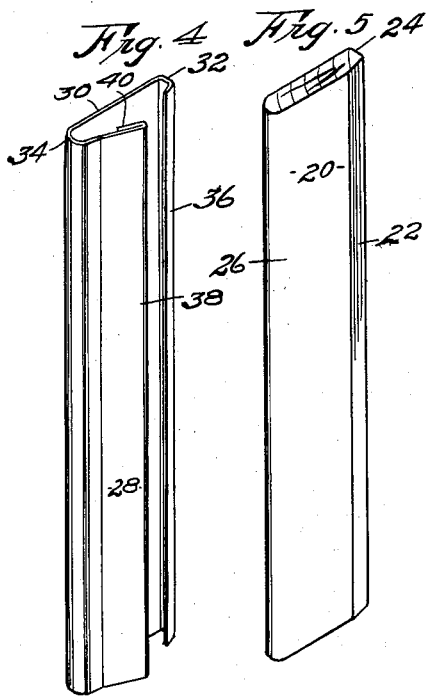
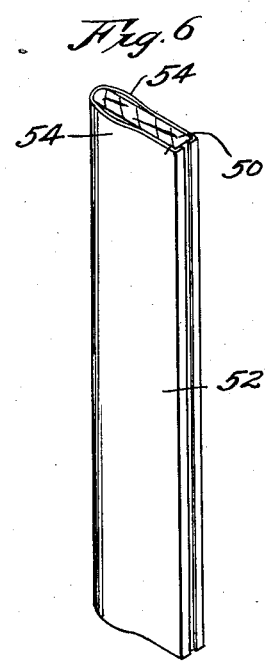
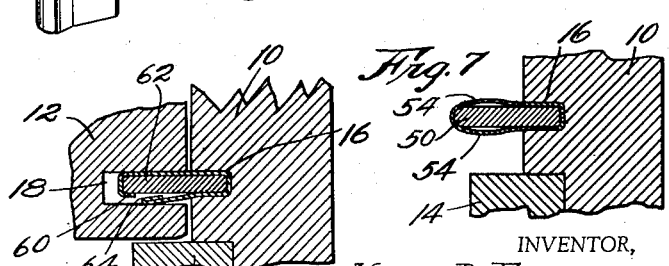
INVENTOR,
Harry B. Foresman.
BY
Hovey & Hamilton,
ATTORNEYS.

Patented Aug. 28, 1934

1,971,603

UNITED STATES PATENT OFFICE 1,971,603

WEATHER STRIP

Harry B. Foresman, Enid, Okla., assignor to Lock Joint Window Company, Kansas City, Mo., a corporation of Delaware Application March 2, 1932, Serial No. 596,273

8 Claims. (Cl. 20—69)

This invention relates to window structures and has particular reference to the sealing members thereof, known as weather stripping.

The primary object of the invention is the contemplation of especially constructed weather stripping of a duo-type that includes a comparatively rigid, elongated body or strip which is sheathed in metal, whereby strength is incorporated in the weather strip and perfect sealing accomplished thereby without experiencing the binding effect which so often presents itself in weather stripping heretofore used.

A further object of this invention is to provide a window structure having a pair of opposed, relatively movable grooves formed in the parts of said structure, one of said grooves being wider than the other for the purpose of receiving a weather strip made up of two distinct members, one of which is formed to present a laterally extending edge to engage one side of the wider groove, whereby to draw the other side thereof snugly against the opposite side of the weather strip.

An even further object of the present invention is to provide a novelly formed weather strip having a rigid strip sheathed by a resilient sheet metal covering, which covering is spaced from the rigid strip sufficiently to close a groove, within which the weather strip is positioned when in operative relation with a sliding closure.

Structural details of the weather strip and its novel function will appear in the minor objects that are made apparent in the following specification, referring to the accompanying drawing showing a preferred and two modified forms of weather stripping, all embodying the concepts of this invention.

In the drawing:

Figure 1 is a fragmentary, perspective view of a window structure including weather stripping made in accordance with this invention.

Fig. 2 is an enlarged, fragmentary, cross section through a window structure at a point where the novel weather strip seals the same.

Fig. 3 is a perspective view of a length of weather stripping showing the relation between the parts thereof.

Fig. 4 is a perspective view of a short length of metal sheathing which forms a part of the weather strip.

Fig. 5 is a perspective view of the body member of the weather strip.

Fig. 6 is a perspective view of a modified form of weather strip embodying this invention.

Fig. 7 is a fragmentary, cross section through a portion of a window structure having as a part thereof the weather strip illustrated in Fig. 6, and, Fig. 8 is a detailed, fragmentary, cross section through a portion of a window structure, showing in section, a yet further modification of the invention.

It is contemplated that all forms of weather strip illustrated in the accompanying drawing be used in window structures having a frame style 10 and a relatively movable sash 12 which is slidable along style 10 adjacent stop 14 in the well known manner. A groove 16 is formed in style 10 along the entire length thereof that is to be traveled by sash 12. A groove 18 is also created in sash 12 in opposed relation with groove 16 and this groove 18 is formed through the length of sash 12 and of a width substantially greater than the width of opposed groove 16.

The structure just above set down is particularly adapted to receive weather stripping embodying this invention and reference will now be made to Figs. 1 to 5 inclusive, wherein is shown the preferred form of the invention.

The body of this weather strip consists of an elongated strip of wood 20 having an inclined longitudinal margin 22 along one side thereof at one of its longitudinal edges 24. The opposite edge 26 of strip 20 is arcuate in cross section and the width of strip 20 is substantially the same from edge 24 to edge 26 with the exception of the narrower portion created by inclined margin 22.

The other part of this weather strip may be formed of resilient copper or other non-corrosive sheet metal and when it is ready for association with strip 20, it assumes a shape such as illustrated in Fig. 4. Sheath 28 encases strip 20, or at least partially so, in the case of the preferred form, and includes a longitudinal side 30, a side 32 and an arcuate side 34. The side of sheath 28 opposite from side 30 is formed to create a flange 36 which lies against and is co-extensive with inclined margin 22 of strip 20. As illustrated in Figs. 1, 2 and 3, the combined thickness of flange 36 and strip 20 from inclined margin 22 to the opposite side is substantially the same as the thickness of strip 20 from margin 22 to edge 26. Such structure permits groove 16 to receive and snugly retain the weather strip when it is associated with the window structure the width of groove 16 and distance across the parts of the weather strip which are positioned therein is in proportion to permit a snug sliding fit. Sheath 28 has a portion thereof spaced laterally from strip 20 throughout its entire length to create a resilient or yieldable bearing face which engages one side of groove 18. In the preferred form, outwardly inclined portion 38 of sheath 28 is slightly reenforced by rebending margin 40 along the projected edge of portion 38, as illustrated. This portion 38 is movable to and from one side of strip 20 and bears against one side of groove 18 to draw the opposite side thereof against side 30 of sheath 28, as shown in Fig. 2.

The arrangement of stop 14, sash 12 and grooves 16 and 18 should be such as to permit the action just mentioned. That is to say, when portion 38 of sheath 28 moves sash 12 laterally, the bearing zone should be between the side of groove 18 and side 30 of sheath 28, rather than between stop 14 and the adjacent side of sash 12. Obviously, the distance across sheath and strip from extended portion 38 through to the outer side of side 30 of sheath 28 is much greater than the distance through the assembly where it engages groove 16.

One of the requirements, therefore, is to make groove 18 wider than groove 16 and slightly less in width than the distance across the portion of weather strip which is projected from groove 16. This feature of the invention presents advantages highly desirable and while the weather strip becomes a sealing member between sash and style 12 and 10 respectively, it also becomes an effective guide for sash 12 when it is sliding along within the window frame.

Reference to Figs. 6 and 7 readily teaches the manner of incorporating the invention in a different form of weather strip. Strip 50 is made of wood like the strip used in the preferred form, and the same is encased in a resilient sheet metal sheath 52 and formed to present longitudinal, opposed bulges 54, extending throughout the length of sheath 52 at each side thereof. Combined strip and sheath 50 and 52 are slipped into groove 16 as shown in Fig. 7, to be projected therefrom where the sash having a wider groove might be moved into place to receive that portion of the weather strip not within groove 16 and which has bulges 54 therealong. These longitudinally extending, opposed bulges engage each side of the groove formed in the window sash and weather stripping forms a guide and seal in an obvious manner.

Fig. 8 illustrates a further modification of the invention and while the relation between grooves 16 and 18 and other parts of the window structure are the same as that illustrated in Figs. 1 and 2, the weather stripping is slightly different in that strip 60 is encased in sheath 62, which is formed as shown to present an inclined resilient bearing face 64 to engage one side of groove 18. This bearing face 64 is strengthened by rebending the side of sheath 62 along that line and the resiliency of the metal establishes an effective seal as before described.

In assembling the formed sheath and strip, it is merely necessary to slide the strip into a sheath longitudinally. Insertion and installation is made without the use of fastening means because of the relation between weather stripping and groove 16. It has been found desirable to treat the strip forming the body of this weather stripping to preclude its absorbing moisture. Such treatment may be accomplished by impregnating the strip with paraffin or like substance after having driven off all moisture contained in the body of the strip.

Having thus described the invention, what is claimed as new and desired to be secured by Letters Patent is:

1. In a window structure, a side style having a groove formed therein; a frame slidable along the style and having a groove formed therein of greater width than said style groove; a strip positioned within both of said grooves; and a resilient sheath engaging all sides of said strip, said sheath having a laterally projected portion along the portion within said wider frame groove to yieldably bear against one side thereof while the opposite side of the sheath bears against the other side thereof.

2. In a window structure, a side style having a groove formed therein; a frame slidable along the style and having a groove formed therein; a strip positioned within both of said grooves; a sheath extending on all sides of said strip; and a continuous, longitudinal, resilient bearing face formed by said sheath within one of said grooves, said bearing face being spaced from the said strip a sufficient distance to contact one side of said groove while the opposite side of the sheath contacts the opposite side thereof.

3. In a window structure, a side style having a groove formed therein; a frame slidable along the style and having a groove formed therein; a strip positioned within both of said grooves; a sheath encasing all sides of said strip; and a resilient, laterally extending wall along one side of said sheath whereby to draw one side of said groove against the opposite side of said sheath.

4. In a window structure, a side style having a groove formed therein; a frame slidable along the style and having a groove formed therein of greater width than said style groove; a strip of substantially uniform thickness positioned within both of said grooves; and a resilient sheath encasing said strip, said sheath being snugly fitted into said narrower groove on all sides of said strip and spaced from the strip within the wider groove whereby to bear against the sides thereof.

5. Weather stripping for window structures or the like comprising an extended rigid strip; an inclined longitudinal margin formed along one side of said strip; and a sheet metal sheath partially encasing said strip, said sheath having a longitudinal flange coextensive with and disposed against said inclined margin and below the surface of the strip adjacent said inclined margin.

6. Weather stripping for window structures or the like comprising an extended rigid strip; an inclined longitudinal margin formed at one edge of said strip; and a resilient sheet metal sheath partially encasing and contacting all sides of said strip, said sheath having a longitudinal flange disposed against said inclined margin, and a projected longitudinal edge spaced from the strip along a plane intermediate said inclined margin at one edge and the opposite edge of said strip.

7. Weather stripping for window structures or the like comprising a rigid strip; a resilient sheet metal sheath encasing said strip; and opposed longitudinally extending bulges spaced apart from said rigid strip and formed by said sheath intermediate its edges.

8. As a new article of manufacture, a weather strip comprising an elongated rigid body; and a tubular sheath of resilient sheet metal encasing said body, said body being slidable lengthwise into said tubular sheath when the weather strip is assembled with the sheath engaging all sides of said rigid body.

HARRY B. FORESMAN.